United States Patent
Bigman

(10) Patent No.: US 10,303,655 B1
(45) Date of Patent: May 28, 2019

(54) STORAGE ARRAY COMPRESSION BASED ON THE STRUCTURE OF THE DATA BEING COMPRESSED

(71) Applicant: EMC Corporation, Hopkinton, MA (US)

(72) Inventor: Ron Bigman, Holon (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 336 days.

(21) Appl. No.: 14/976,532

(22) Filed: Dec. 21, 2015

(51) Int. Cl.
| | |
|---|---|
| *G06F 17/30* | (2006.01) |
| *G06F 16/174* | (2019.01) |
| *G06F 3/06* | (2006.01) |
| *G06F 16/84* | (2019.01) |

(52) U.S. Cl.
CPC ........ *G06F 16/1744* (2019.01); *G06F 3/0604* (2013.01); *G06F 3/064* (2013.01); *G06F 3/0688* (2013.01); *G06F 16/86* (2019.01)

(58) Field of Classification Search
CPC ...................................... G06F 17/30
See application file for complete search history.

(56) References Cited

U.S. PATENT DOCUMENTS

| | | | | |
|---|---|---|---|---|
| 7,103,608 B1* | 9/2006 | Ozbutun | ........... | G06F 17/30492 707/604 |
| 2008/0294676 A1* | 11/2008 | Faerber | .................. | H03M 7/30 707/999.102 |
| 2013/0060780 A1* | 3/2013 | Lahiri | ................. | H03M 7/3088 707/741 |
| 2013/0103655 A1* | 4/2013 | Fanghaenel | ....... | G06F 17/30336 707/693 |
| 2014/0156609 A1* | 6/2014 | Christian | .......... | G06F 17/30339 707/693 |
| 2015/0178305 A1* | 6/2015 | Mueller | ............ | G06F 17/30129 707/693 |
| 2017/0060772 A1* | 3/2017 | Krishnappa | ............. | G06F 12/12 |

* cited by examiner

*Primary Examiner* — Khanh B Pham
(74) *Attorney, Agent, or Firm* — Daly, Crowley, Mofford & Durkee, LLP

(57) ABSTRACT

In one aspect, a method includes storing a database on a storage array, determining a plurality of most used values in the database, forming a table using the plurality of most used values and compressing data in the database according to the table. In another aspect, an apparatus includes electronic hardware circuitry configured to store a database on a storage array, determine a plurality of most used values in the database, form a table using the plurality of most used values and compress data in the database according to the table. In a further aspect, an article includes a computer-readable medium that stores computer-executable instructions. The instructions cause a machine to store a database on a storage array, determine a plurality of most used values in the database, form a table using the plurality of most used values and compress data in the database according to the table.

18 Claims, 6 Drawing Sheets

200

| Invoice ID | First name | Last name | Sales amount |
|---|---|---|---|
| 12 | Brad | Pitt | 199 |
| 15 | John | Stewart | 135 |
| 177 | John | Doe | 356 |
| 13 | Mr | Bin | 234 |
| 55 | Tom | Doe | 456 |
| 111 | Tom | Pitt | 4 |

| John | Tom | Doe | Pitt |
|---|---|---|---|

*FIG. 3*

| | | | |
|---|---|---|---|
| John | Tom | Doe | Pitt |
| 12 | Brad | 199 | 15 |
| Stewart | 135 | 177 | 356 |
| 13 | Mr | Bin | 234 |
| 55 | 456 | 111 | 4 |

400

500

Generate mapping table
502

↓

For each block add header with pointers
506

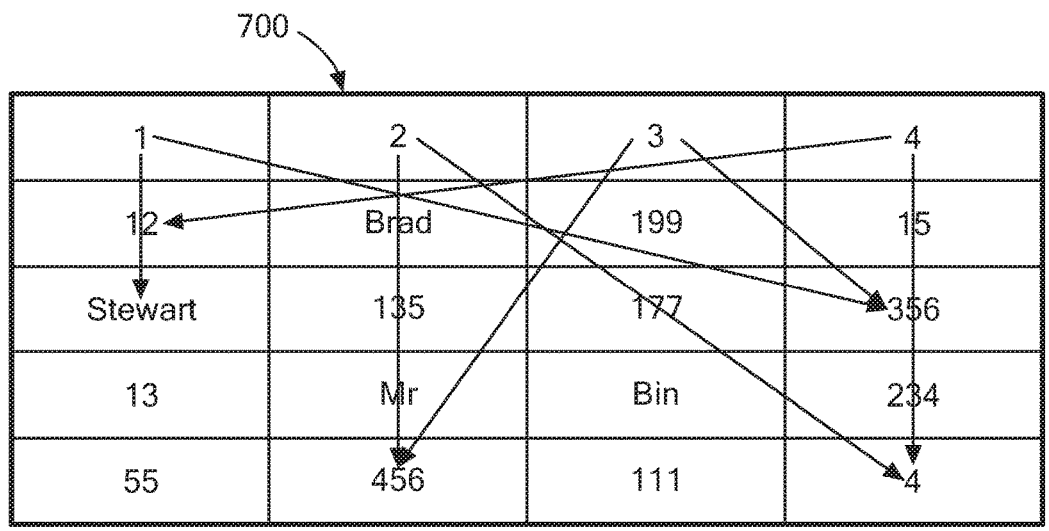
*FIG. 7*
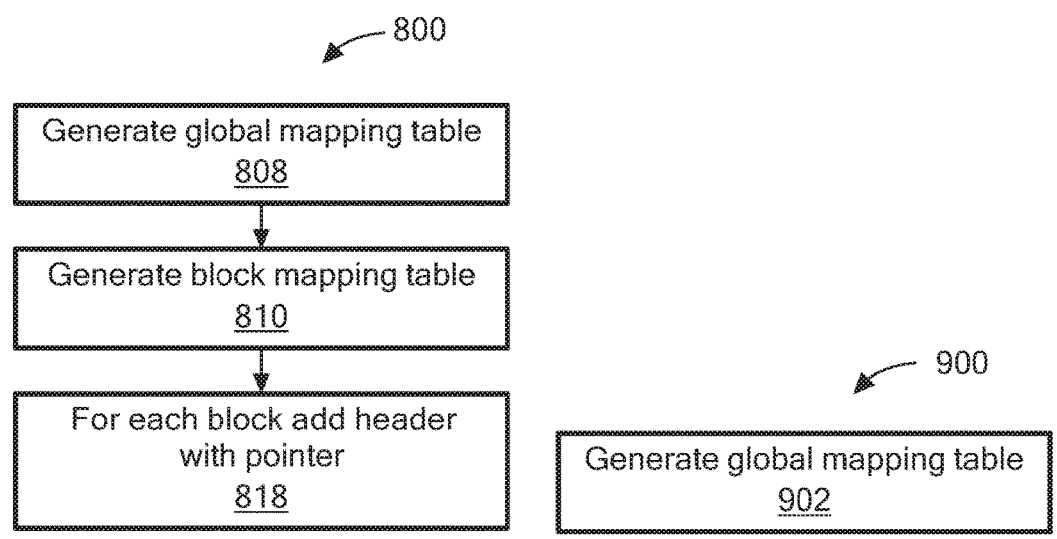
*FIG. 8*      *FIG. 9*

STORAGE ARRAY COMPRESSION BASED ON THE STRUCTURE OF THE DATA BEING COMPRESSED

BACKGROUND

There are many types of storage disks. For example, there are flash disks, ATA (Advanced Technology Attachment or AT Attachment) disks and SATA (serial ATA) disks. When comparing the disks, the flash disks are more expensive but provide faster data retrieval (e.g., 1 million I/Os (input/output requests) per second) than ATA disks while the ATA disks are more expensive but provide faster data retrieval than the SATA disks (e.g., 100 per second). One way to be able to use less flash disks is to compress the data stored on a flash disk.

SUMMARY

In one aspect, a method includes storing a database on a storage array, determining a plurality of most used values in the database, forming a table using the plurality of most used values and compressing data in the database according to the table.

In another aspect, an apparatus includes electronic hardware circuitry configured to store a database on a storage array, determine a plurality of most used values in the database, form a table using the plurality of most used values and compress data in the database according to the table.

In a further aspect, an article includes a non-transitory computer-readable medium that stores computer-executable instructions and the instructions cause a machine to store a database on a storage array, determine a plurality of most used values in the database, form a table using the plurality of most used values and compress data in the database according to the table.

BRIEF DESCRIPTION OF THE DRAWINGS

FIG. 2 is a table of an example of data from a database.

FIG. 3 is a table of an example of a mapping table.

FIG. 7 is a diagram of an example of using the block mapping table to point to other data.

FIG. 8 is a flowchart of an example of a process to perform block+table level compression.

FIG. 9 is a flowchart of an example of a process to perform table level compression.

DETAILED DESCRIPTION

Figure 1:
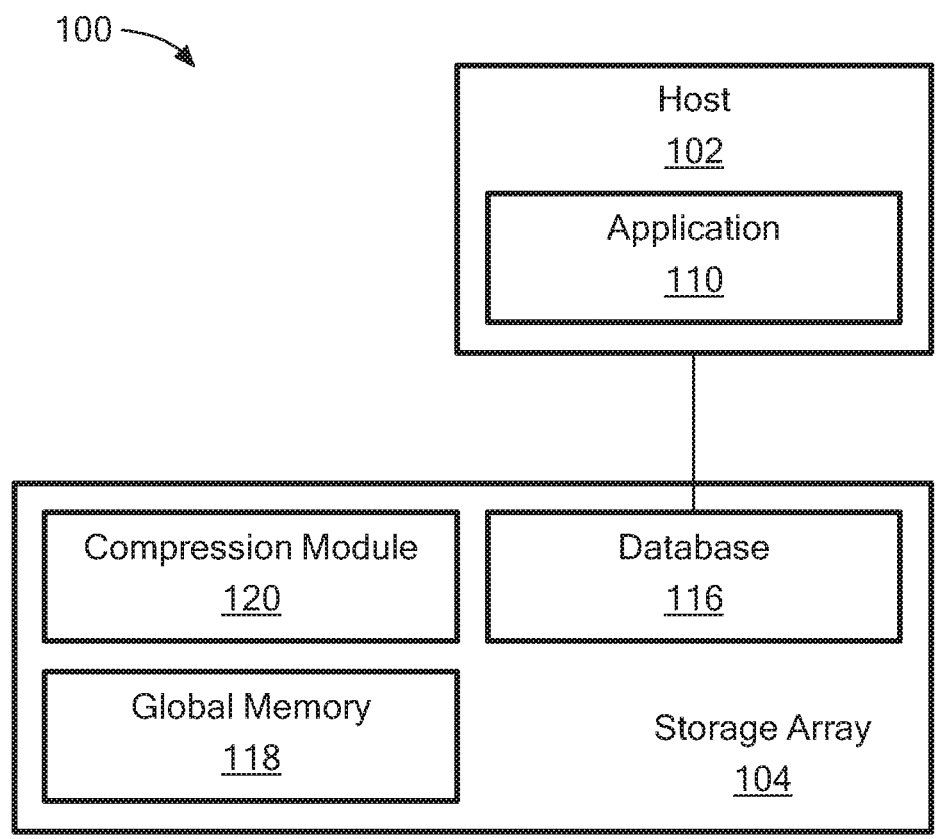
FIG. 1 is a block diagram of an example of a system to compress data at the storage array.

Referring to FIG. 1, a system 100 is an example of a system to compress data at the storage array. The system 100 includes a host 102, which includes an application 110. The system 100 also includes a storage array 104, which includes a database 116, a global memory 118 and a compression module 120. The application 110 reads data from and writes data to the database 116. As will be further described herein the compression module 120 of the storage array 104 is used to compress data in the database 116 using the structure of the data. In one example, the structure of the data is retrieved from statistics about the database and prior knowledge of how the data is stored. In particular, database application providers (e.g., Oracle SQL servers) include statistics that may be retrieved about repeating values (e.g., Oracle histograms). Also, the structure in which the data is stored may not be published, but generally the structure does not change very often and is easily identified.

In one example, the storage array 104 is flash storage array. In other examples, the storage array 104 is a deduplication device. In other examples, the storage array 104 may be part of a device used for scalable data storage and retrieval using content addressing. In one example, the storage array 104 may include one or more of the features of a device for scalable data storage and retrieval using content addressing described in U.S. Pat. No. 9,104,326, issued Aug. 11, 2015, entitled "SCALABLE BLOCK DATA STORAGE USING CONTENT ADDRESSING," which is assigned to the same assignee as this patent application and is incorporated herein in its entirety. In other examples, the storage array 104 is a flash storage array used in EMC® XTREMIO®.

In one example, the compression logic (e.g., logic to perform at least one of block level compression, block+table level compression, table level compression and so forth) chosen is identified upon writing to the storage array. In one example, having the compression logic in the storage array 104 allows for the system 100 to compress data when the system is not very busy. In one example, the system 100 may be configured to determine to compress the data only if the storage array 104 is almost full and determines the appropriate time in which the CPU is free in order to perform the task. In other examples, the system 100 has the capability to determine what data to compress and what not to compress (e.g., compress data on flash array only).

Referring to FIG. 2, a database table 200 is an example of data from the database 116. As will be described further herein, the compression module 120 can implement at least three compression techniques to compress the data in the database 116 (e.g., the database table 200).

Referring to FIG. 3, a first method to compress data is called a block level compression. The block level compression enables relevant data to exist in a block and makes the block self-contained. In one example, a block contains database records from the same database table or multiple database tables. In some examples the block contains database records limited to the same database table. A mapping table such as, for example, a mapping table 300, is derived from the data in the database table 200. The mapping table 300 includes data that are used frequently in the database table 200 such as "John," "Tom," "Doe," and "Pitt."

Figures 4, 5:
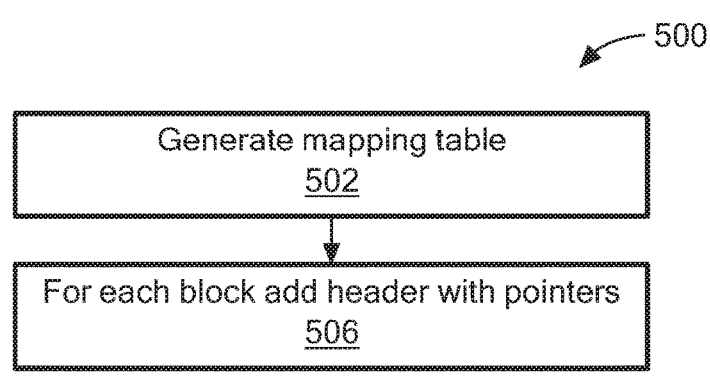
FIG. 4 is a diagram of an example of using the mapping table to point to other data.
FIG. 5 is a flowchart of an example of a process to perform block level compression.

Referring to FIG. 4, using the mapping table 300, pointers are used to point to other associated data values as shown in diagram 400. For example, "Tom" points to "456" and "4."

Referring to FIG. 5, a process 500 is an example of a process to perform block level compression. Process 500 generates a mapping table (502). For example, the compression module 120 selects the most frequent values and generates the mapping table 300. In one example, a user may designate a number of the most frequent values to use.

For each block, process 500 adds a header with pointers to other data (506). For example, using the mapping table generated in processing block 502, the compression module 120 places in the header, for each block, pointers to other data associated with the data in the mapping table.

Figure 6A:
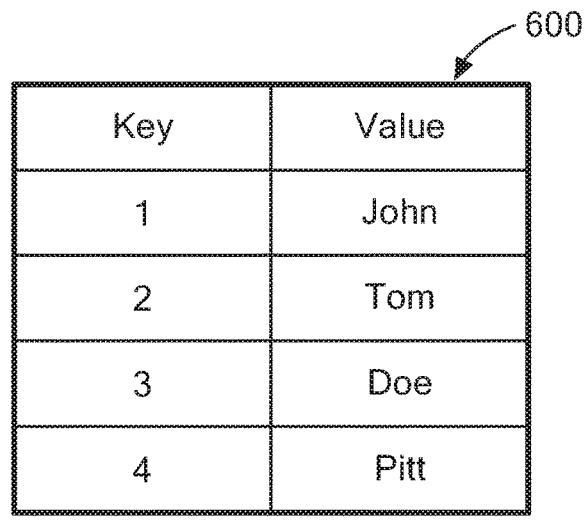
FIG. 6A is a table of an example of a global mapping table.
Figure 6B:
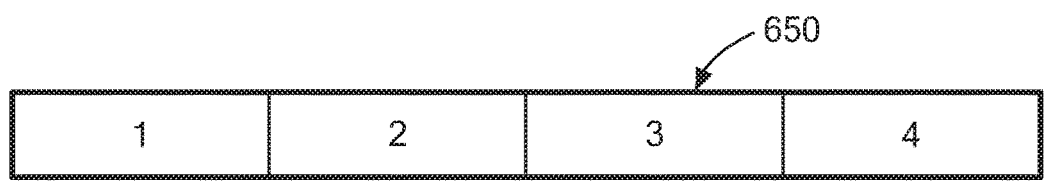
FIG. 6B is a table of an example of a block mapping table.

Referring to FIGS. 6A and 6B, a second method to compress data is a block+table level compression. In this method, for each database table or subsection of a database table, a global mapping table is kept and stored in global memory (e.g., the global memory 118). The global mapping table keeps keys to represent the most frequent values. For example, a global mapping table 600 is used for data in the database table 200. That is, instead of using "John," "Tom," "Doe," and "Pitt," "John," "Tom," "Doe," and "Pitt" will substituted with smaller size representations such as keys "1," "2," "3" and "4," respectively, as shown in the block mapping table 650. In some examples where a storage array is scalable, the global memory is accessible across array nodes.

Referring to FIG. 7, using the block mapping table 650, pointers are added to each block to point to other associated data values as shown in diagram 700. For example, "2" points to "456" and "4." Each data set may be mapped to X bytes depending on the number of most frequent values kept.

For example, using 2 bytes per value will allow keeping 65K values per data base table. Values appearing in the global mapping table and represented as 2 bytes appear in the block mapping table, which will reduce the size of the mapping inside the block and will also require some structure stored in memory. However, this data structure may be as big as allowed. For example, if 2 bytes are chosen per database table, and possibly only for the 100 biggest database tables 90 MB must be kept (assuming a value has an average size of 10 bytes).

Referring to FIG. 8, a process 800 is an example of a process to perform block+table level compression. Process 800 generates a global mapping table (808). For example, the compression module 120 selects the most frequent values and generates the global mapping table 600. In one example, a user may designate a number of the most frequent values to use.

Process 800 generates the block mapping table (810). For example, using the global mapping table 600, the block mapping table 650 is generated.

For each block, process 800 adds a header with pointers to other data (818). For example, using the block mapping table 650 generated in processing block 810, the compression module 120 places in the header, for each block, pointers to other data associated with the data in the block mapping table 650.

Referring to FIG. 9, a process 900 is an example of a process to perform table level compression. Process 900 generates a global mapping table (902). The global memory table is similar to global memory table 600 to be used by each block. For example, the global mapping table will contain the same mapping table 600 just relevant to all blocks within a table.

Figure 10:
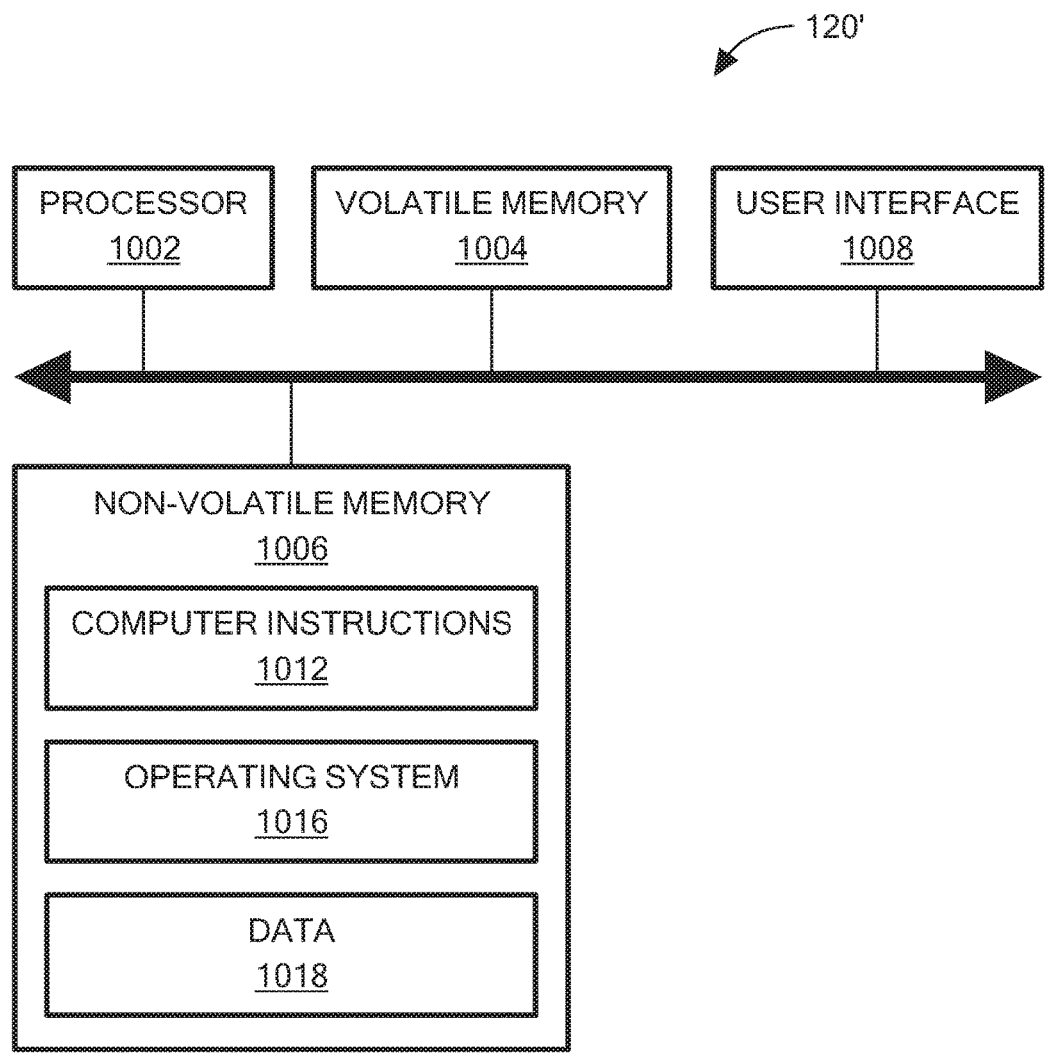
FIG. 10 is a block diagram of an example of a computer on which any portion of the processes of FIGS. 5, 8 and 9 may be implemented.

Referring to FIG. 10, in one example, a compression module 120 is a migration module 120'. The compression module 120' includes a processor 1002, a volatile memory 1004, a non-volatile memory 1006 (e.g., hard disk) and the user interface (UI) 1008 (e.g., a graphical user interface, a mouse, a keyboard, a display, touch screen and so forth). The non-volatile memory 1006 stores computer instructions 1012, an operating system 1016 and data 1018. In one example, the computer instructions 1012 are executed by the processor 1002 out of volatile memory 1004 to perform all or part of the processes described herein (e.g., processes 500, 800 and 900).

The processes described herein (e.g., process processes 500, 800 and 900) are not limited to use with the hardware and software of FIG. 10; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 500, 800 and 900 are not limited to the specific processing order of FIGS. 5, 8 and 9, respectively. Rather, any of the processing blocks of FIGS. 5, 8 and 9 may be re-ordered, combined or removed, performed in parallel or in serial, as necessary, to achieve the results set forth above.

The processing blocks (for example, in the processes 500, 800 and 900) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:
   determining a plurality of most used values in a database stored on a storage array;
   forming a table containing the plurality of most used values;
   retrieving statistical information about the database;
   identifying a structure of data from the statistical information;
   identifying a manner in which the data is stored;
   selecting a compression technique from a plurality of compression techniques as a function of the structure of the data and the manner in which the data is stored; and
   compressing the data in the database according to the table and selected compression technique;
   wherein upon selecting a block and table level compression as the compression technique, the compressing further comprises:
   generating a global mapping table from the table by mapping a key to each of a corresponding one of the most used values; and
   generating a block mapping table according to one or more keys from the global mapping table, the block mapping table substituting the most used values from the global mapping table with corresponding keys;
   wherein compression logic for performing the plurality of compression techniques is stored in the storage array, and the compression technique is selected prior to writing to the storage array.

2. The method of claim 1, wherein upon selecting a block level compression as the compression technique, the compressing the data in the database according to the table and the selected compression technique comprises, for each header of each block in the table, adding pointers to point to other data associated with the data.

3. The method of claim 2, wherein the block contains database records spanning multiple database tables of the database.

4. The method of claim 1, wherein upon selecting the block and table level compression as the compression technique, the compressing the data in the database according to the table further comprises, for each block in the block mapping table, adding pointers to point to other data associated with the data.

5. The method of claim 1, wherein the statistical information about the database is retrieved from a histogram.

6. The method of claim 1, further comprising:
   selecting data to compress based on a type of storage device in the storage array.

7. The method of claim 1, wherein the plurality of most used values comprises a user-tunable parameter.

8. The method of claim 1, wherein the global mapping table is configured for access across a plurality of nodes in the storage array.

9. The method of claim 1, wherein the compression technique selected is a table-level compression technique and the forming a table using the plurality of most used values comprises forming the global mapping table, wherein mapping corresponds to all blocks within the database.

10. An apparatus, comprising:
    electronic hardware circuitry configured to:
    determine a plurality of most used values in a database stored on a storage array;
    form a table containing the plurality of most used values;
    retrieve statistical information about the database;
    identify a structure of data from the statistical information;
    identify a manner in which the data is stored;
    select a compression technique from a plurality of compression techniques as a function of the structure of the data and the manner in which the data is stored; and
    compress the data in the database according to the table and selected compression technique;
    wherein upon selecting a block and table level compression as the compression technique, the compressing further comprises:
    generating a global mapping table from the table by mapping a key to each of a corresponding one of the most used values; and
    generating a block mapping table according to one or more keys from the global mapping table, the block mapping table substituting the most used values from the global mapping table with corresponding keys;
    wherein compression logic for performing the plurality of compression techniques is stored in the storage array, and the compression technique is selected prior to writing to the storage array.

11. The apparatus of claim 10, wherein the circuitry comprises at least one of a processor, a memory, a programmable logic device or a logic gate.

12. The apparatus of claim 11, wherein the processor determines a system state, and the compressing the data in the database according to the table and selected compression technique includes compressing the data upon determining the system state indicates a value representing a non-busy state.

13. The apparatus of claim 10, wherein upon selecting a block level compression as the compression technique, the circuitry configured to compress the data in the database according to the table comprises circuitry configured to, for each header of each block in the table, add pointers to point to other data associated with the data.

14. The apparatus of claim 10, wherein upon selecting the block and table level compression as the compression technique, the circuitry configured to compress the data in the database according to the table further comprises, for each block in the block mapping table, add pointers to point to other data associated with the data.

15. The apparatus of claim 10, wherein the storage array is a flash disk array.

16. An article comprising:
    a non-transitory computer-readable medium that stores computer-executable instructions, the instructions causing a machine to:
    determine a plurality of most used values in a database stored on a storage array;
    form a table containing the plurality of most used values;
    retrieve statistical information about the database;
    identify a structure of data from the statistical information;
    identify a manner in which the data is stored;
    select a compression technique from a plurality of compression techniques as a function of the structure of the data and the manner in which the data is stored; and
    compress the data in the database according to the table and selected compression technique;

wherein upon selecting a block and table level compression as the compression technique, the compressing further comprises:

generating a global mapping table from the table by mapping a key to each of a corresponding one of the most used values; and generating a block mapping table according to one or more keys from the global mapping table, the block mapping table substituting the most used values from the global mapping table with corresponding keys;

wherein compression logic for performing the plurality of compression techniques is stored in the storage array, and the compression technique is selected prior to writing to the storage array.

17. The article of claim 16, wherein upon selecting a block level compression as the compression technique, the instructions causing the machine to compress the data in the database according to the table comprises instructions causing the machine to, for each header of each block in the table, add pointers to point to other data associated with the data.

18. The article of claim 16, wherein upon selecting the block and table level compression as the compression technique, the instructions causing the machine to compress the data in the database according to the table further comprises instructions causing the machine to, for each block in the block mapping table, add pointers to point to other data associated with the data.

* * * * *